July 23, 1968 W. J. ROANTREE 3,393,574
VARIABLE SPEED SCREW GEARING MECHANISM
Filed April 21, 1967 4 Sheets-Sheet 2
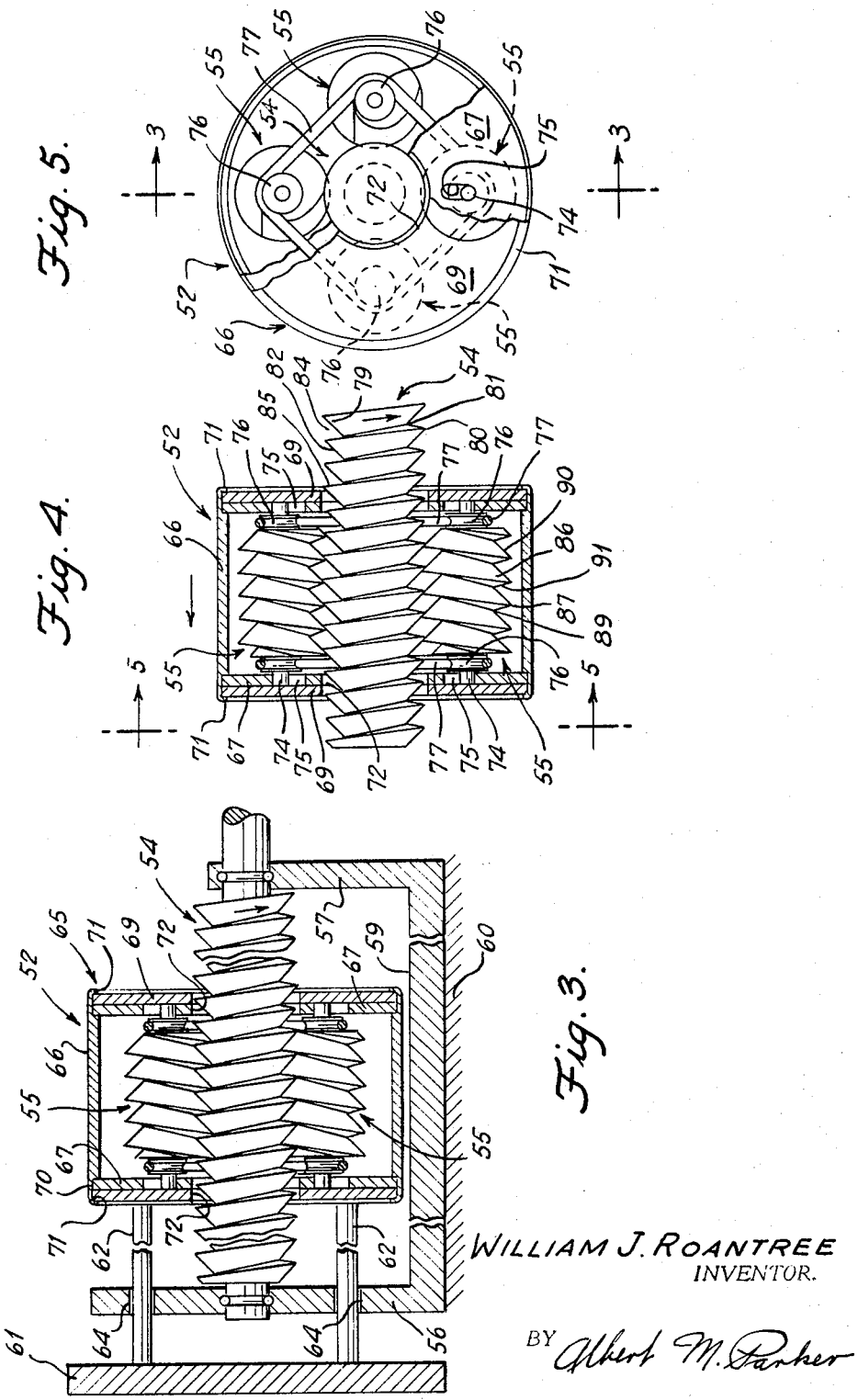
WILLIAM J. ROANTREE
INVENTOR.
BY Albert M. Parker
ATTORNEY.

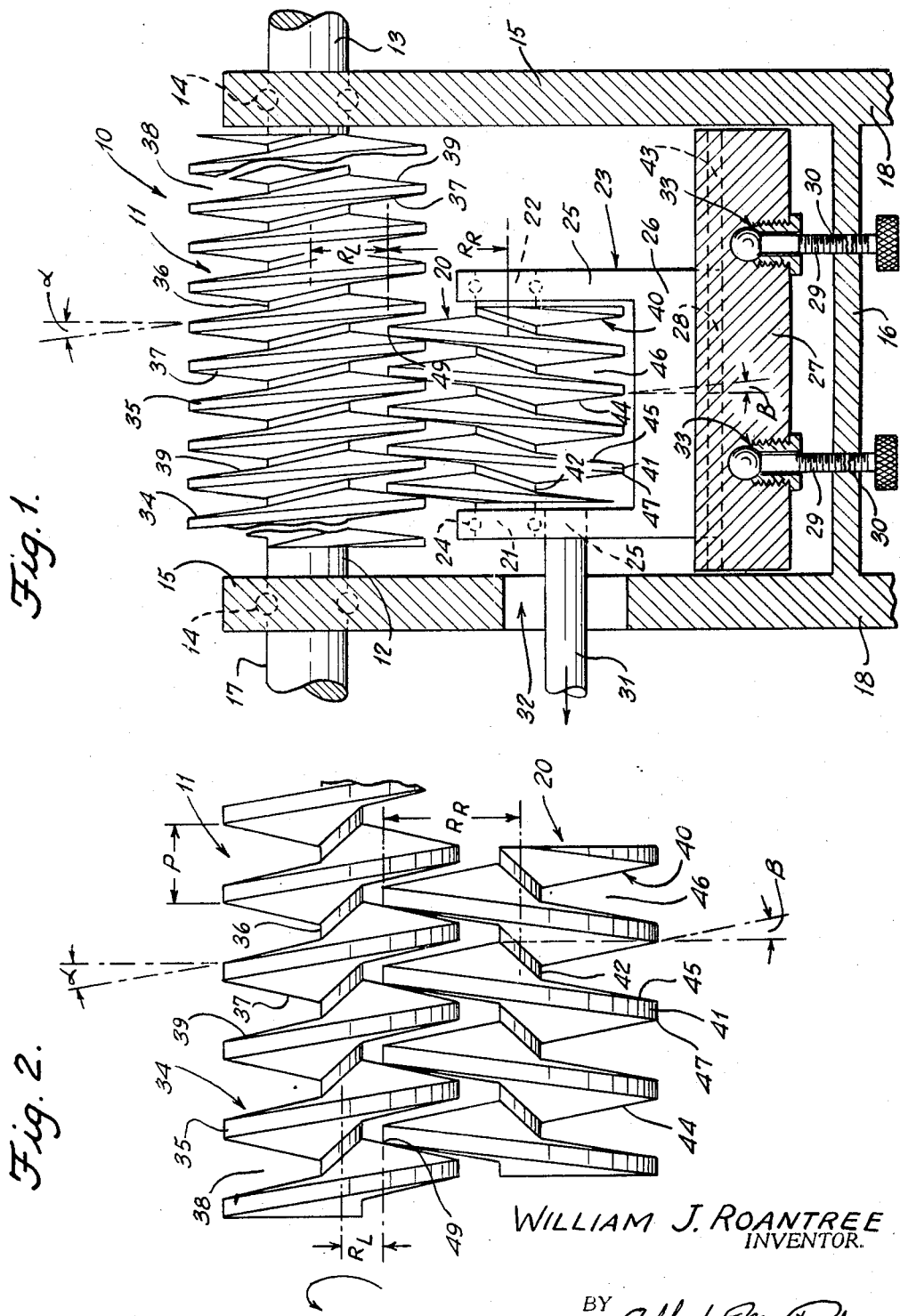

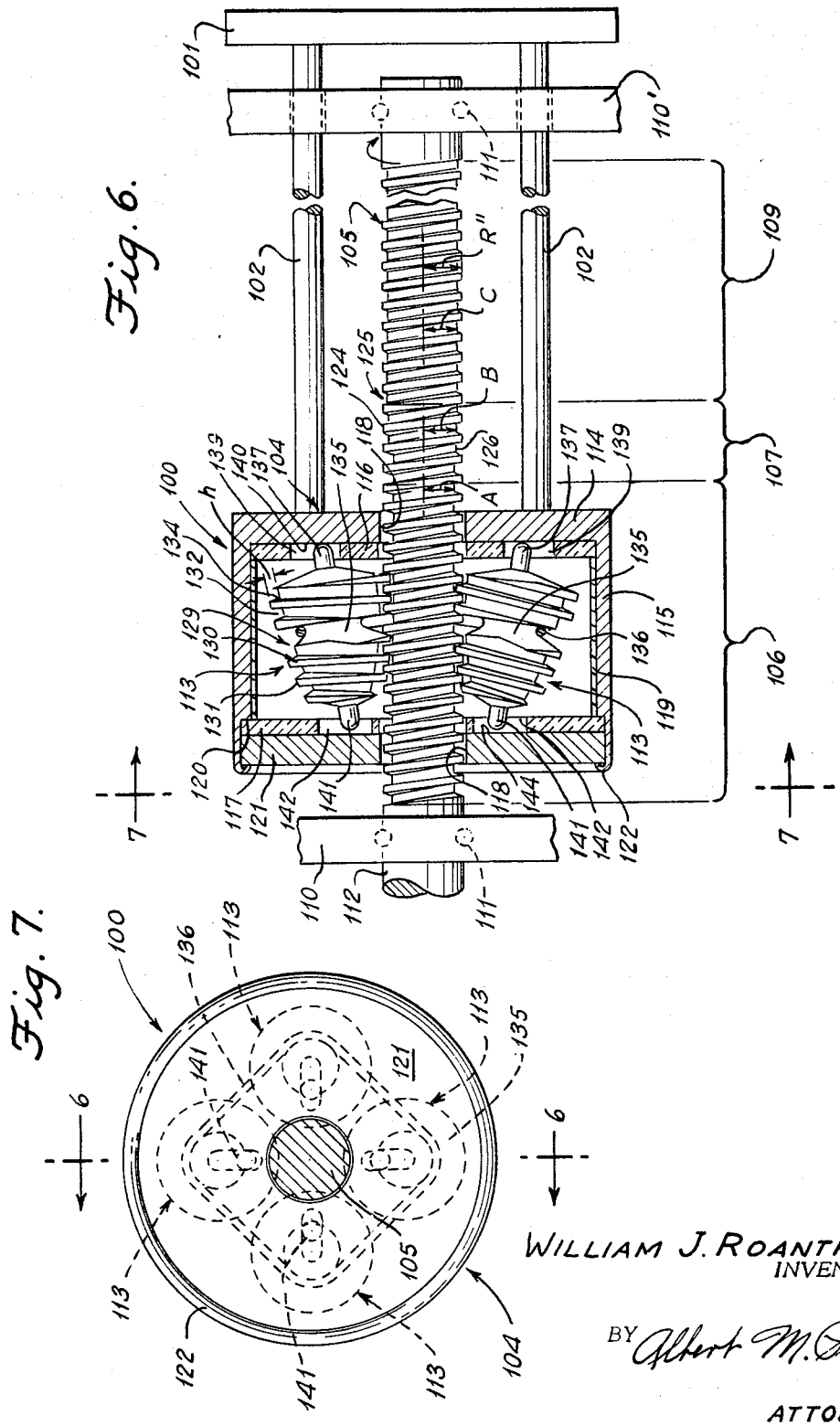

July 23, 1968  W. J. ROANTREE  3,393,574
VARIABLE SPEED SCREW GEARING MECHANISM
Filed April 21, 1967  4 Sheets-Sheet 4
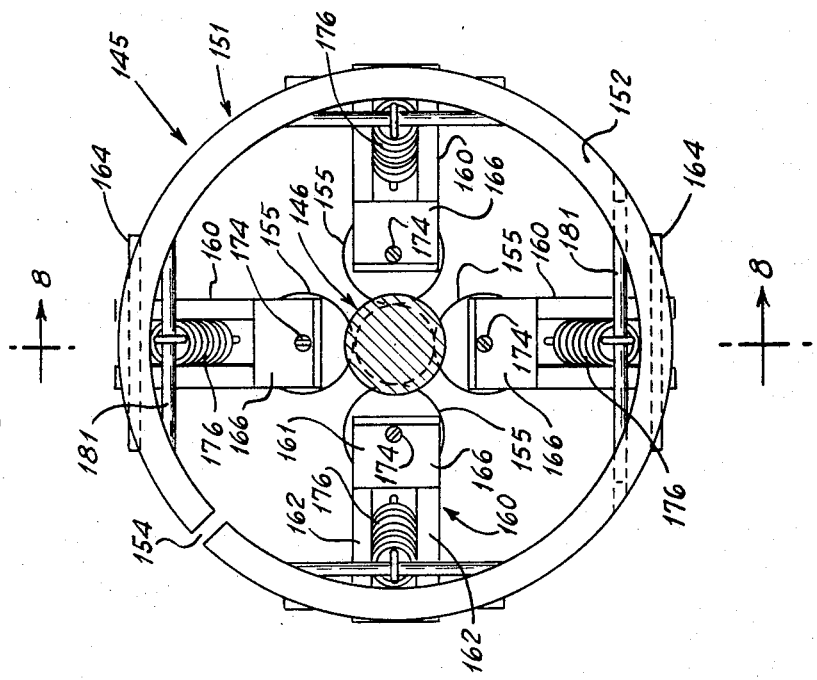
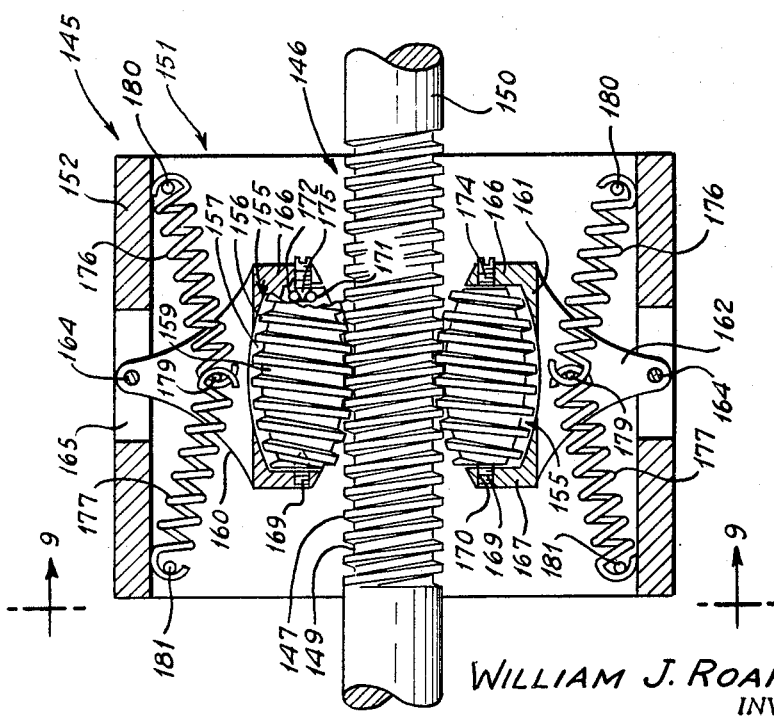
WILLIAM J. ROANTREE
INVENTOR.
BY Albert M. Parker
ATTORNEY.

United States Patent Office
3,393,574
Patented July 23, 1968

3,393,574
VARIABLE SPEED SCREW GEARING MECHANISM
William J. Roantree, Port Washington, N.Y., assignor to Roantree Electro-Mech Corporation, Port Washington, N.Y., a corporation of New York
Continuation-in-part of application Ser. No. 614,339, Feb. 6, 1967. This application Apr. 21, 1967, Ser. No. 632,769
12 Claims. (Cl. 74—424.7)

ABSTRACT OF THE DISCLOSURE

A gearing mechanism for converting rotary to linear motion, the ratio between the rotary and linear motion being variable. The mechanism includes a lead screw having a thread of a constant pitch, the thread being in driving relationship with one or more differential rollers having a thread of generally the same pitch, the roller or rollers being mounted upon a carriage mounted for linear travel along the lead screw. The lead (L) is derived from the following equation:

$$L = L_L + \frac{D_L}{D_R} L_R$$

where:

$L_L$ = lead of the lead screw (positive for right-hand thread)
$L_R$ = lead of differential roller (positive if right-hand thread)
$D_L$ = diameter of the driving surface of the lead screw ($+$ if male thread, $-$ if female thread), and
$D_R$ = diameter of the driving surface of the differential roller ($+$ if male thread, $-$ if female thread).

Variations in the value of L may be effected by changing one or both of $D_L$ and $D_R$.

---

This application is a continuation-in-part of application Ser. No. 614,339, filed Feb. 6, 1967, entitled, "Gearing Mechanism."

Background of the invention (1) *Field of the invention.*—This invention relates to a variable gearing mechanism which converts rotary motion to linear motion. The mechanism includes a lead screw and one or more differential rollers having screw threads of generally the same pitch as those on the lead screw and drivingly connected to such threads. As the lead screw rotates, the differential roller is rotated thereby, the resultant speed of the carriage upon which the roller is mounted being determined by the ratio of the effective diameters of the lead screw and roller at their zones of driving engagement.

(2) *Description of the prior art.*—Conversion of rotary motion to linear motion has been secured by the use of a lead screw having two thread portions of the same hand but somewhat different pitch threadedly engaged with respective nuts. Rotation of the lead screw causes the nuts to separate or approach each other, depending upon the direction of rotation of the screw, at a rate which is a function of the difference between the pitches of the respective thread portions. Such prior mechanism may be employed to give large mechanical addvantages in reciprocating mechanisms such as platen presses, lifting devices, jacks, and the like. Such prior mechanism is of fixed ratio, however, since with a given difference in pitch of the thread portions the linear motion of the two nuts relative to each other with respect to the angular motion of the screw is fixed.

Summary of the invention

The gearing mechanism in accordance with the invention provides a simple means for converging rotary motion to linear motion, the ratio between the rotary motion and the linear motion being variable but substantially synchronized at any selected adjusted position of the mechanism. In some embodiments of the mechanism in accordance with the invention the mechanism is manually adjustable so as to vary the ratio between rotary motion and linear motion as desired. In other embodiments of the mechanism the rate of linear motion is automatically adjusted relative to the rate of rotary or angular motion as by changing the effective diameter of the driving portion of the lead screw at one or more zones thereof relative to the effective diameter of the driving portion of the differential roller or rollers drivingly engaged with such screw. In other embodiments the effective diameter of the driving portion of the thread on the lead screw is constant and the effective diameter of the driving portion of the thread on the differential roller or rollers is automatically varied, as by being made responsive to changes in the load or thrust imposed upon the differential roller. This may be accomplished by making the differential roller with the driving portion of the thread thereon of varying diameter and mounting such roller so that the inclination of its axis may vary in accordance with the thrust imposed thereon, whereby selectively to present thread portions of different diameter for driving engagement with the thread on the lead screw.

In the various embodiments of variable gearing mechanism disclosed herein the threads on the lead screw and the differential roller or rollers are of generally the same pitch and opposite hand, the threads on the lead screw and the differential roller being in meshing, direct driving engagement. In certain disclosed embodiments the radially outer surfaces of the lands on one of the members drivingly engage the roots of the grooves of the screw thread on the other of said members. In other disclosed embodiments, radially outer edges of the lands on one of said members drivingly engage corresponding sides or flanks of the lands on the other of said members.

In those embodiments wherein the ratio between the speed of rotary motion and the speed of linear motion is automatically varied in accordance with the thrust imposed upon the differential roller as it travels linearly, such speed of linear motion decreases as the thrust increases. This precludes the overloading of the power source. Such mechanism is of advantage in applications such as platen presses wherein it is desired that the platen shall travel more slowly and with an increased thrust at a certain portion or portions of its working stroke such as at the end thereof.

Brief description of the drawing

FIG. 1 is a somewhat schematic fragmentary view partially in vertical axial section and partially in side elevation of a first embodiment of variable gearing mechanism in accordance with the invention;

FIG. 2 is an enlarged fragmentary view of a portion of the mechanism of FIG. 1 showing on an enlarged scale the zone of driving engagement between the flanks of the lands on the lead screw and the radially outer edges of a differential roller in driving engagement therewith;

FIG. 3 is a fragmentary somewhat schematic view partially in veritcal axial section and partially in side elevation of a second embodiment of variable gearing mechanism in accordance with the invention, such mechanism automatically adjusting the ratio between the speed of rotation of the lead screw and the linear motion of the differential rollers in accordance with variations in end thrust imposed upon the rollers, the mechanism being shown with the differential rollers in the positions which they assume when they are axially unloaded, the section being taken along the line 3—3 in FIG. 5 looking in the directions of the arrows;

FIG. 4 is a fragmentary view of the mechanism of FIG. 3 shown similarly to the view in FIG. 3 but with the differential rollers in the positions which they assume when they are axially loaded;

FIG. 5 is a view in transverse section of the gearing mechanism of FIGS. 3 and 4 with the rollers in the loaded position of FIG. 4, the section being taken along the line 5—5 of FIG. 4 looking in the direction of the arrows;

FIG. 6 is a fragmentary somewhat schematic view partially in vertical axial section and partially in side elevation of a third embodiment of variable gearing mechanism in accordance with the invention, such mechanism, which is variable in response to variations in the thrust imposed thereon and is here shown as being axially unloaded, having a lead screw with axially spaced portions of different effective driving diameters and differential rollers drivingly engaged therewith, such rollers having zones of different effective driving diameters and being so mounted that their inclinations relative to the axis of the lead screw automatically change whereby to maintain drivingly relationship with the lead screw as the rollers travel therealong, the section being taken along the line 6—6 of FIG. 7;

FIG. 7 is a view in vertical transverse section through the mechanism of FIG. 6, the section being taken along the line 7—7 of FIG. 6 looking in the driection of the arrows;

FIG. 8 is a fragmentary somewhat schematic view partially in vertical axial section and partially in side elevation of a fourth embodiment of gearing mechanism in accordance with the invention, the mechanism being shown in substantially axially unloaded condition, such gearing mechanism employing a lead screw having a thread of constant effective driving diameter and tiltable differential rollers having threads of varying diameter in driving engagement with the thread on the lead screw, the angle of inclination of the differential rollers relative to the lead screw being variable in accordance with variations in the end thrust imposed upon the rollers, the section being taken along the line 8—8 of FIG. 9 looking in the direction of the arrows; and FIG. 9 is a view in vertical transverse section through the mechanism of FIG. 8, the section being taken along the line 9—9 of FIG. 8 looking in the direction of the arrows.

*Description of the preferred embodiments*

As evident from the above, there are shown and described herein four embodiments of variable gearing mechanism in accordance with the invention. Such embodiments are as follows:

(1) FIGS. 1 and 2;
(2) FIGS. 3, 4, and 5;
(3) FIGS. 6 and 7; and
(4) FIGS. 8 and 9.

In embodiment (1) the ratio between the speed of rotation of the lead screw and the linear travel of the carriage bearing the differential roller is manually adjustable. In embodiments (2), (3), and (4) the adjustment of such ratio is automatic, being responsive to variations in end thrust imposed upon such carriage and thus upon the differential rollers mounted thereon. In all of the disclosed mechanisms the variation in the ratio $D_L/D_R$ effects a change in the rate of travel of the differential rollers along the lead screw in accordance with the above equation $$L = L_L + \frac{D_L}{D_R} L_R$$

In all of embodiments (1), (2), (3), and (4) the factor $D_R$ (effective driving diameter of the differential roller) is varied; in embodiment (3) the factor $D_L$ (effective driving diameter of the lead screw) is also varied.

Turning now to the drawings, the gearing mechanism of FIGS. 1 and 2 is designated generally by the reference character 10. In such mechanism there is a longitudinally extending lead screw 11 which has unthreaded stub shaft or trunnion portions 12 and 13 on the ends thereof. Such trunnions are mounted in bearings 14 in spaced upstanding supports 15 which extend in spaced parallel relationship from a base 16. The base 16 and the supporting portions 15 are in turn mounted upon a fixed structure such as a frame 18. The lead screw 11 is rotated by driving means (not shown) connected to a portion 17 of the trunnion 12 extending beyond its support 15.

In the embodiment shown, a single differential roller 20 is mounted below the lead screw 11 with the axis of the roller parallel to that of the lead screw. The differential roller, which is threaded in its main, intermediate extent, has stub shafts or trunnions 21 and 22 on opposite ends thereof, such trunnions being mounted in bearings 24 in respective upstanding parallel supports 25. Supports 25 are integrally connected to a base 26, the supports 25 and the base 26 constituting a carriage and being mounted for movement with the roller 20 axially of the lead screw 11 in a manner to be described. The differential roller 20 has threads thereon of the same pitch as but opposite hand from the threads on the lead screw 11. In the embodiment shown, the threads on the lead screw and on the differential roller are of a modified Acme type, the axial width of the lands of the thread on the differential roller being somewhat less than the axial width of the lands on the lead screw.

Adjustment of the distance between the axes of the lead screw and the differential roller, while permitting the described axial movement of the differential roller and its carriage, is provided by disposing a plate or table 27 having its upper surface T-slotted at 43 between the supports 15, the lower surface of the base 26 of the carriage being provided with T-shaped projections slidably received in the T slots 43 in the upper surface of the plate 27. Plate 27 is selectively adjusted toward and away from the axis of the lead screw 11 by adjusting screws 29 which are threadedly received in spaced vertical passage 30 in the portion 16 of the support for the lead screw. As the plate 27 is thus adjusted it carries with it the carriage 25, 26 and thus the differential roller 20, whereby to adjust the distance between the axes of the lead screw and the differential roller. This results in a change of the ratio $D_L/D_R$ in the above equation in a manner to be described.

The carriage 25, 26 is shown attached to a thrust rod 31 which extends through an opening 32 in the left-hand support 15. The thrust rod 31 may thus reciprocate relative to the support 15. The differential roller, carriage 25, 26, and the thrust rod 31 will (1) remain axially fixed or will travel either to the right (2) or the left (3) with a given direction of rotation of the lead screw 11, depending upon the value of $D_L/D_R$. Such first condition (1) is obtained when the position of the carriage 25, 26 relative to the lead screw is adjusted so that $D_L = D_R$; such carriage travels in one direction, for example direction (2), when $D_L$ is greater than $D_R$ and travels in the other direction, for example direction (3), when $D_L$ is less than $D_R$.

As will be seen more particularly in FIG. 2, the lead screw has lands 34 having axially short circular cylindrical radially outer surfaces 35 and grooves 38 between the land 34. The grooves 38 have roots 36. The lands 34 have a left flank 37 and a right flank 39, the axial distance between flanks 37 and 39 being such throughout a substantial part of the radial depth of the grooves 38 as freely to receive the lands 40 of the thread on the differential roller 20. Lands 40 similarly have axially short circular cylindrical outer surfaces 41 and grooves 46 between successive lands 40. Each of grooves 46 has a root 42 and a right and a left flank 45 and 44, respectively.

Driving engagement between the threads on the lead screw and the differential roller is effected in this embodiment between the right flank 39 of the lands 34 on the lead screw and the left-hand radially outer edge 47 of the lands 40 of the thread on the differential roller, such points of driving engagement being designated 49.

The configuration of the screw threads are such as to maintain freedom from engagement between the lands 34 on the lead screw and lands 40 on the differential roller other than at the point 49 throughout an extended range of adjustment of the distance between the axes of such members. For this purpose the threads on the members are made such that the angle $\alpha$ between the flank 39 and the transverse plane of the lead screw somewhat exceeds the angle $\beta$ between the flank 44 and a similar plane of the differential roller. It will be obvious that the distances $R_L$ and $R_R$ from the point of driving engagement 49 to the axis of the lead screw 11 and differential roller 20, respectively, are ½ $D_L$ and $D_R$, respectively.

The embodiment of gearing mechanism of FIGS. 3, 4, and 5 is generally designated by the reference character 52. In such embodiment there is a lead screw 54 which is engaged by a plurality of differential rollers 55 (four shown). Lead screw 54 is rotatably mounted in suitable bearings in spaced parallel upstanding supporting members 56 and 57 which are integrally secured to a horizontal base 59. The base 59, in turn, is fixedly secured to a fixed member 60 which may be a frame of a machine. The mechanism 54 is shown reciprocably driving a platen 61 through the medium of thrust rods 62 which are secured to the carriage in which the differential rollers 55 are mounted. The thrust rods 62 are slidingly received in passages 64 in the support 56 so that both the platen and the carriage are accurately guided for linear motion and are prevented from rotation about the axis of the lead screw 54.

The carriage 65 which carries the differential rollers 55 includes a circular cylindrical shell 66 which is disposed coaxially of the lead screw and telescoped thereabout. The opposite ends of the shell 66 are of reduced radial thickness, there being a transverse annular inner shoulder 70 at the juncture of the intermediate main portion of the shell and such end portions thereof. Within the thus formed seats at the opposite ends of the shell 66 there are disposed annular inner plates 67 and, outwardly thereof, outer or end closure plates 69. The plates 67 and 69 are retained in their respective seats by end portions 71 of the thin outer portions of the shell, such end portions being bent inwardly over and tightly gripping the radially outer edges of the plates 69.

The plates 67 and 69 have central openings 72 therethrough which slidingly and guidingly receive the radially outer portions of the thread 54 on the lead screw. Each of the differential rollers 55 is provided with a pintle or stub shaft 74 on each end thereof, the pintles 74 on each roller being slidably received within radially extending oppositely disposed axially aligned slots 75 in the respective inner plates 67. Such construction permits the differential rollers 55 to travel from the position thereof shown in FIG. 3, wherein the carriage and the rollers are axially unloaded and lie with the pintles 74 adjacent the inner ends of the slots 75, to the position shown in FIG. 4 wherein the carriage and rollers are substantially axially loaded and the rollers lie in their radially outward position with the pintles 74 at the outer end of the slot 75. The rollers 55 are constantly urged radially inwardly toward the position of FIG. 3 by resilient belts 77 which are entrained over pulleys 76 affixed to each of the differential rollers 55 beyond the ends of the screw thread thereon.

The lead screw 54 has a screw thread of generally buttress or saw-toothed configuration in section, the successive lands 79 of such screw threads having radially outer edges 80, the grooves 84 between successive lands 79 having a V-shaped root 81. The inclination of the rear or left flank 82 of the lands 79 with respect to a transverse plane is substantially greater than that of the forward or right flank 85 of such lands. The lands 79 on the lead screw have a direct meshing and driving engagement with the lands 86 on the differential rollers 55. In the embodiment shown the lands 86 are generally complementary to the grooves 84 between lands 79 on the lead screw with the exception that the right or forward flank 90 of lands 86 and the left or rear flank 91 thereof are inclined relative to a plane transversely to the axis of the roller at an angle which is somewhat less than the angles of inclination on the flanks 82 and 85 of the lands 79 on the lead screw. As a consequence, driving engagement between the lead screw and the differential rollers takes place between the outer edges 87 of the lands 86 of the differential rollers and the rear or left-hand flank 82 of the lands 79 of the lead screw. When the differential rollers lie in their unloaded position of FIG. 3, edges 87 of their lands substantially engage the roots 81 of the thread on the lead screw, there being clearance between the edges 80 of the lands on the lead screw and the roots 89 of the threads on the differential rollers.

It will be apparent that when the differential rollers lie in the position of FIG. 3, the effective diameter $D_R$ of the driving portion of the rollers is equal to its diameter and the effective diameter $D_L$ of the driving portion of the lead screw has its smallest value. Accordingly, the value of the lead L yielded by the mechanism is at a maximum. When the carriage and thus the differential rollers 55 are subjected to appreciable forwardly directed thrust, that is, there is substantial opposition to the travel of the platen 61 to the left, the differential rollers 55 are thrust radially outwardly to a position which is a function of the value of such opposing thrust. FIG. 4 shows a position of maximum thrust with the differential rollers lying in their outermost terminal positions.

It will be seen that as the differential rollers are progressively thrust radially outwardly from the position of FIG. 3, the value of $D_L$ progressively increases; the value of $D_R$ remains constant, since the drive to the differential rollers always takes place by way of the edges 87 of their lands 86. Consequently, as the opposing thrust upon the platen 61 increases, the value of L, that is, the speed of linear travel of the carriage and the differential rollers, progressively decreases. As pointed out above, this is a valuable featuer, since it protects the prime mover against overload, and yields a desirable increase in the force which the platen 61 can exert in that portion of a working stroke thereof in which opposition to the travel of the platen increases.

The third species of gearing mechanism, shown in FIGS. 6 and 7, is designated generally by the reference character 100. Such gearing mechanism is shown as driving a platen 101 through the medium of thrust rods 102 which are secured at one end to the platen and at the other to a carrier or cage 104 mounting and enclosing differential rollers 113 forming a part of the geairng mechanism, said rollers 113 drivingly cooperating with a lead screw 105. The lead screw 105 is shown supported at its left-hand end in a supporting means 110 and at its right-hand end in a supporting means 110′, both of which may be portions of a fixed frame, there being suitable bearings 111 disposed between supports 110, 110′ and the lead screw. The lead screw may be driven by a means (not shown) drivingly connected to the portion 112 of the lead screw projecting beyond the support 110. Thrust rods 102 are guidingly received in bores in supporting means 110′.

The differential rollers 113 cooperate with a lead screw 105 in a manner generally similar to that of the embodiments of FIGS. 1–4, inclusive, of applicant's prior application Ser. No. 614,339. In the present embodiment, however, the lead screw 105 and differential rollers 113 cooperate so that with a given speed of rotation of the lead screw the carriage 104 when axially unloaded or subjected to a predetermined axial thrust travels at speeds which are different in different zones of the lead screw spaced longitudinally thereof. Thus when under such conditions the differential rollers 113 drivingly cooperate with a first zone 106 of the lead screw 105, the carriage 104 travels at a faster speed and when the differential rollers cooperate with zone 109 of the lead screw the carriage 104 travels at a slower speed. Disposed between zones 106 and 109 of the lead screw is a transition zone 107 in which the speed of the carriage 104 is progressively slower as it travels from zone 106 toward zone 109.

The carriage or cage 104 has an outer body with a first portion of generally cup shape, such first portion having a base or transverse end portion 114 and a circular cylindrical sidewall portion 115. Within such first portion of the housing, and abutting the end wall 114 thereof, there is a first radially slotted inner plate 116 which may be made, for example, of tough strong plastic material, as indicated. A second, inner plate 117, which is similar to plate 116, is disposed adjacent the left-hand end of such first portion of the housing, the plates 116 and 117 being maintained in axially spaced parallel position by a spacer sleeve 119 which is disposed therebetween and telescoped within the sidewall 115 of the first portion of the housing. The left-hand end of the sidewall 115 is provided with an inner annular radial shoulder 120 axially beyond which the sidewall is of thinner cross section, whereby to provide an annular radially inwardly disposed seat. The outer edge of plate 117 abuts shoulder 120 and is retained in the seat by an end plate 121 which abuts the outer surface of plate 117 and is maintained in forcible gripping contact therewith by the incurled outer edge 122 of the thin walled portion of the sidewall 115. The end wall 114 and the plate 116, as one unit, and the plate 117 and cover plate 121, as another unit, are each provided with a central passage 118 which guidingly receives the outer surfaces of the lands of the lead screw 105.

The lead screw 105 is shown as having a thread of modified Acme shape, such thread having a helical land 124, successive turns of the land being separated by a helical groove 125. The circular cylindrical root surfaces of such grooves are designated 126. Throughout the length of the lead screw the lands 124 have circular cylindrical outer surfaces of a uniform or constant diameter. In the zone 106, however, at which the carriage 104 is traversed at a greater rate, the roots 126 of the helical grooves 125 have a first smaller uniform radius A, and in zone 109, at which the carriage 104 travels at a slower rate, the roots 126 have a second larger uniform radius C. In the zone 107 the roots 126 of the grooves 125 have a radius B which varies uniformly from the radius A of zone 106 to the radius C of zone 109.

Within the housing of carriage 104 and spaced uniformly around the axis of the lead screw 105 there are a plurality (four shown) of the above-mentioned differential rollers 113. The body of each of such rollers, which are identical, is generally in the form of half of a barrel converging in a direction to the left. Each of the differential rollers 113 has a thread of modified Acme shape thereon, such thread having a land 130 with an outer surface 131 of appreciable axial width. The height $h$ of the land 130 is constant throughout the extents of both portions of the thread on the roller 113. Between successive turns of the land 130 there is a helical groove 132, the depth of such groove, that is, the height $h$, of land 130, somewhat exceeding the height of the land 124 on the lead screw in the zone 106 thereof. Intermediate its length, each of rollers 113 is provided with an annular groove 135, the differential rollers being constantly urged radially inwardly toward the lead screw by a resilient belt or band 136, which may be in the form of an O-ring, disposed in the grooves 135 in the rollers.

The differential rollers 113 are guided for rocking movement in radial axial planes through the lead screw as required to maintain driving relationship between the roots 125 of the thread on the lead screw and the outer surfaces 131 of the lands on the differential rollers. Thus at their right-hand ends the differential rollers are provided with stub shafts or pintles 137 having rounded outer ends, shafts 137 being slidably received within the radial slots 139 in the guide plate 116. At their left-hand ends the differential rollers are provided with similar stub shafts 141 which are slidably received within radial slots 142 in the left-hand guide plate 117. The axial distance between the central rounded ends of stub shafts 137 and 149 is slightly less than the axial distance between the inner surface 140 of housing portion 114 and the inner surface 144 of the cover plate 121. Consequently, the differential rollers are free to rock, the upper one shown in FIG. 6 rocking in a clockwise direction as the carriage 104 travels to the right along the lead screw 105 so that the differential rollers then drivingly cooperate with the zone 107 of the lead screw. Following this, as the carriage enters the zone 109 the differential rollers rock in a reverse direction so as to return generally to the angular position thereof shown in FIG. 6.

It will be apparent that when the carriage 104 is in a position to cooperate with zone 106 of the lead screw, the value of $D_L$ in the equation above-referred-to is small so that the ratio $D_L/D_R$ is small and the value of L is large. When the carriage 104 cooperates with the zone 109 of the lead screw, however, the value of $D_L$ is larger so that the value of L is smaller. As above explained, the differential rollers are inclined at substantially the same angle relative to the axis of the lead screw when the carriage cooperates with either of zones 106 and 109 of the lead screw. Consequently, no substantial variable enters the equation for the values of L at such zones. In the construction shown, there is no problem as to the maintenance of synchronism or phasing of the differential rollers, because they are self-adjusting. Should one of the differential rollers be temporarily overloaded, it will slow down its translational motion to relieve the excessive load thereon and thereby restore itself to synchronism with the other rollers.

It will be understood that the embodiment of variable gearing mechanism of FIGS. 6 and 7 is responsive to variations in the axial thrust imposed upon the carriage 104 as well as the above-discussed variations in diameter of the root of the helical groove on the lead screw. The mounting of the differential rollers 113 is such that upon variations in end thrust upon the platen 101 and thus upon the carriage 104 the differential rollers each rocks about a transverse axis at right angles to the longitudinal axis of the roller. Thus when a substantial retarding force is imposed upon platen 101 in the direction from right to left, the differential rollers 113 rock about such transverse axis to bring the smaller diametered zones of such rollers into driving engagement with the flanks of the lands of the thread on the lead screw. The degree of rocking of the differential rollers, which is opposed by the resilient belt or band 136, is proportional to the end thrust imposed upon the carriage; accordingly, the decrease in the speed of linear travel of the carriage from its speed when it is axially unloaded is also proportional to such imposed end thrust or load on the platen.

The fourth embodiment of gearing mechanism in accordance with the invention is shown in FIGS. 8 and 9, where it is designated generally by the reference character 145. A lead screw 146 having a modified Acme thread of uniform dimensions has a helical land 147, successive turns of which are separated by a helical groove having a root 149. The lead screw 46 is supported in suitable bearings (not shown) for rotation about its axis while being held against axial movement. The lead screw may be driven at end 150 thereof by power means not shown.

Disposed about the lead screw for travel longitudinally thereof is a cage or carriage 151 having a housing in the form of a spring ring 152 which is split by a radial opening 154. The ring 152 constantly thrusts the rollers 113 forcibly radially inwardly into driving engagement with the lead screw. Mounted upon the ring 152 in rocking supports to be described is a plurality of barrel shaped differential rollers 155 (four shown) which are spaced uniformly about the axis of the lead screw. Each of the rollers 155, which are symmetrical in an axial direction, have a thead of modified Acme shape with a land 156 of constant radial height, successive turns of the land being separated by a groove 157 having a root 159.

The rocker mounts for each of the rollers 155 are designated 160. Such mounts have a body 161 which is symmetrical in an axial direction, the body 161 having axially central radially outwardly extending parallel ears 162. The outer ends of the ears 162 are connected to ring 151 by a pivot pin 164 which extends generally as a secant of the outer surface of the ring 152, the ears 160 being disposed within axially extending slots 165 through the ring. The relationship between the radial length of the ears 162 and the configuration of the body of rollers 155 is such that the radially inner portions of the lands 156 on the rollers which confront the lead screw as shown in FIG. 8 lie on a portion of a circle coaxial of the pivot pins 164.

At each of its ends the body 161 is provided with a generally radially inwardly projecting flange, that at the right in FIG. 8 being designated 166 and that to the left 167. Each of the rollers 155 is provided at its left-hand end with a trunnion 169 which is journalled in a bearing 170 in flange 167. At its other end the body of the roller 155 is provided with an annular recess 171 which forms the outer race of a ball bearing. The balls 172 of such bearing are disposed in a circle within such recess and cooperate with the axially inner conical end 175 of a set screw 174 which is threaded into the flange 166 of body 161, such end 175 forming the inner race of the bearing.

The gearing mechanism is provided with means which maintain the rocking mounts 160 and the differential rollers 155 carried thereby in generally the central position shown in FIG. 8 when the carriage 151 is subjected to no appreciable endwise thrust. Such means, in the present embodiment, takes the form of a right-hand coil tension spring 176 and a similar left-hand coil tension spring 177 for each of the rocker or rocking mounts 160, the axially inner ends or tangs of such springs being connected to a central cross pin 179 extending between the ears 162 of the respective rocker mount 160. The right-hand end of spring 176 is connected to a cross pin 180 and the left-hand end of spring 177 is connected to a cross pin 181, pins 180 and 181 being disposed adjacent the axially outer ends of ring 152. When the carriage 151 is subjected to appreciable endwise thrust in either direction, the rocker mounts 160 pivot in the appropriate direction about the respective pivot pins 164. The effective driving diameter of the portion of the land 156 on the differential rollers which then engages the root 149 of the groove in the lead screw is then decreased. Consequently, the value of $D_R$ in the above equation is decreased, the value of the ratio $D_L/D_R$ is correspondingly increased, and thus the value of L, that is, the rate of travel of the carriage 151 at a given speed of rotation of the lead screw 146, decreases as the axial thrust on the carriage increases within limits.

Although a limited number of embodiments of the invention have been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art.

I claim:

1. A variable differential gearing mechanism for converting rotary motion to linear motion, comprising two members of which one is a lead screw and the other of which is a differential roller, the two members being disposed with parts thereof in side-by-side relationship, means mounting the lead screw and the differential roller for rotation about their respective axes, said last named means being so constructed and arranged as to permit relative movement of said parts of the differential roller and the lead screw in a direction generally along the axis of the lead screw, the lead screw and the differential roller having screw threads of the substantially same pitch thereon, each of said screw threads having alternating helical lands and grooves, serially connected means including driving portions of the screw threads for drivingly connecting the two members for joint rotation, driving means for rotating one of said members about its axis, and means for varying the ratio of the effective diameters of the portions of the two members which are in driving relationship with each other, whereby upon rotation of the driven member the said parts of the two members travel generally axially with respect to each other at a speed which is substantially a function of the instantaneous ratio between the effective diameters of the portions of the screw threads on said two members which are in driving relationship with each other.

2. A mechanism as claimed in claim 1, wherein the two members are disposed with said parts thereof in generally parallel relationship.

3. A mechanism as claimed in claim 1, wherein the threads on the two members are of opposite hand, and the two screw threads are drivingly engaged in meshing relationship with the lands on one member disposed within the grooves on the other member.

4. A mechanism as claimed in claim 3, wherein the lead screw is directly driven by the driving means, and the means for varying the ratio of the effective diameters of the portions of the threads on the two members which are in driving relationship with each other comprises means responsive to the end thrust imposed upon the differential roller for varying the position of the axis of the differential roller relative to the axis of the lead screw.

5. A mechanism as claimed in claim 4, wherein the means for varying the ratio of the diameters of the zones of the two members which are in driving relationship with each other comprises means for varying the distance between the axes of the lead screw and the differential roller.

6. A mechanism as claimed in claim 3, wherein the radially outer surfaces of the lands of the thread on said one member drivingly engage the surfaces at the roots of the thread on the other member.

7. A mechanism as claimed in claim 6, wherein the said outer surfaces of the lands of the thread on said one member and the surfaces at the roots of the thread on the other member are smooth and frictionally drivingly engage each other, and comprising means for thrusting said members toward each other and said drivingly engaged surfaces thereof into tight engagement with each other.

8. A mechanism as claimed in claim 6, wherein the driving portion of the lead screw has, in that order, a first zone having a first substantially constant effective diameter, a second zone having an effective diameter which varies at a substantially constant rate from said first diameter, and a third zone of substantially constant effective diameter extending from the end of the second zone.

9. A mechanism as claimed in claim 6, wherein the differential roller is barrel-shaped and has a large effective diameter at a zone intermediate its ends, such diameter decreasing from said zone of maximum diameter toward both ends of the differential roller, and means for varying the inclination of the axis of the differential roller relative to the axis of the lead screw, whereby to vary the ratio between the effective diameters of the portions of the threads on the two members which are drivingly engaged with each other.

10. A mechanism as claimed in claim 3, wherein corresponding radially outer edges of the lands of the thread on one member drivingly engage the corresponding sides of the lands on the other member at locations spaced radially outwardly from the roots of the grooves of the thread on said other member.

11. A mechanism as claimed in claim 10, wherein the grooves on the other member between the lands thereon are of greater axial width throughout a substantial portion of their radial depth than the width of the tips of the lands on the other member, and wherein the means for varying the ratio of the effective diameters of the portions of the two members which are in driving relationship with each other comprises means for varying the distance between the axes of the lead screw and the differential roller.

12. A mechanism as claimed in claim 1, wherein the thread on one of said members has a driving portion of constant effective diameter throughout a zone thereof of substantial axial length, and the thread on the other of said members has a driving portion of variable effective diameter throughout a zone thereof of substantial axial length, and wherein the means for varying the ratio of the effective diameters of the portions of the threads on the two members which are in driving relationship with each other comprises means for varying the inclination of the axes of the lead screw and the differential roller relative to each other.

References Cited

UNITED STATES PATENTS

| | | | |
|---|---|---|---|
| 2,525,326 | 10/1950 | Wahlmark | 74—424.8 |
| 2,831,363 | 4/1958 | Lohr | 74—424.8 |
| 3,101,623 | 8/1963 | Hayes | 74—459 X |
| 3,165,007 | 1/1965 | Neubarth | 74—424.8 |
| 3,173,304 | 3/1965 | Strandgren | 74—459 |
| 3,295,385 | 1/1967 | Jenny | 74—424.8 |

FRED C. MATTERN, Jr., *Primary Examiner.*

L. H. GERIN, *Assistant Examiner.*